(12) United States Patent
Suarez Gracia et al.

(10) Patent No.: US 10,114,681 B2
(45) Date of Patent: Oct. 30, 2018

(54) IDENTIFYING ENHANCED SYNCHRONIZATION OPERATION OUTCOMES TO IMPROVE RUNTIME OPERATIONS

(71) Applicant: QUALCOMM Incorporated, San Diego, CA (US)

(72) Inventors: Dario Suarez Gracia, Teruel (ES); Gheorghe Cascaval, Palo Alto, CA (US); Han Zhao, Santa Clara, CA (US); Tushar Kumar, San Jose, CA (US); Aravind Natarajan, Sunnyvale, CA (US); Arun Raman, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 15/085,108

(22) Filed: Mar. 30, 2016

(65) Prior Publication Data

US 2017/0286182 A1 Oct. 5, 2017

(51) Int. Cl.
*G06F 9/46* (2006.01)
*G06F 9/52* (2006.01)

(52) U.S. Cl.
CPC . *G06F 9/52* (2013.01); *G06F 9/46* (2013.01)

(58) Field of Classification Search
None
See application file for complete search history.

(56) References Cited

U.S. PATENT DOCUMENTS

| 5,469,575 | A | * | 11/1995 | Madduri | G06F 9/52 |
| | | | | | 707/999.003 |
| 6,041,383 | A | | 3/2000 | Jeffords et al. | |
| 7,016,923 | B2 | | 3/2006 | Garthwaite et al. | |
| 7,159,215 | B2 | | 1/2007 | Shavit et al. | |
| 7,209,918 | B2 | | 4/2007 | Li | |
| 7,852,336 | B2 | | 12/2010 | Brown et al. | |
| 2004/0088702 | A1 | * | 5/2004 | Garthwaite | G06F 12/0276 |
| | | | | | 718/100 |

(Continued)

FOREIGN PATENT DOCUMENTS

WO 0046672 A1 8/2000

OTHER PUBLICATIONS

International Search Report and Written Opinion—PCT/US2017/020164—ISA/EPO—May 26, 2017.

*Primary Examiner* — Dong U Kim
(74) *Attorney, Agent, or Firm* — The Marbury Law Group, PLLC

(57) ABSTRACT

Embodiments include computing devices, systems, and methods identifying enhanced synchronization operation outcomes. A computing device may receive a first resource access request for a first resource of a computing device including a first requester identifier from a first computing element of the computing device. The computing device may also receive a second resource access request for the first resource including a second requester identifier from a second computing element of the computing device. The computing device may grant the first computing element access to the first resource based on the first resource access request, and return a response to the second computing element including the first requester identifier as a winner computing element identifier.

32 Claims, 7 Drawing Sheets

(56) References Cited

U.S. PATENT DOCUMENTS

| | | | |
|---|---|---|---|
| 2006/0230408 A1* | 10/2006 | Frigo | G06F 9/30043 718/108 |
| 2008/0271042 A1* | 10/2008 | Musuvathi | G06F 11/3688 718/108 |
| 2010/0161572 A1 | 6/2010 | Daum et al. | |
| 2012/0159495 A1* | 6/2012 | Rajagopalan | G06F 9/4881 718/102 |
| 2014/0281243 A1* | 9/2014 | Shalf | G06F 12/0813 711/122 |
| 2016/0154677 A1* | 6/2016 | Barik | G06F 13/4239 718/105 |
| 2016/0170813 A1* | 6/2016 | Robison | G06F 9/522 718/106 |

* cited by examiner

IDENTIFYING ENHANCED SYNCHRONIZATION OPERATION OUTCOMES TO IMPROVE RUNTIME OPERATIONS

BACKGROUND

Guaranteeing correctness in parallel application execution requires hardware atomic synchronization instructions. Such instructions ensure that if multiple processor cores try to concurrently update the same variable, only one processor core will succeed. Some examples of atomic synchronization instructions supported by current hardware include load-link/store-conditional, compare-and-swap, fetch-and-increment, etc.

Synchronization instructions only return binary notifications of success (win) or failure (loss) to the processor cores, causing an information gap between the hardware and the software. Therefore, a processor core only receives a notification of whether its update was successful. However, arbiters or other resource synchronization and management components on an interconnection network between the processor cores and resources do not share other information related to a successful/failed update. Therefore, information is lost between atomicity hardware and the instruction set architecture.

Exclusive access to a resource by two or more processor cores that are executing concurrently may be obtained by executing atomic synchronization instructions in order to gain access to said resource. The processor core that executes the synchronization instruction successfully will have obtained exclusive access to the resource.

Exclusive access to a contended resource may also be granted to a processor core issuing a resource access request for the contended resource on a first come first serve basis. A resource manager can determine whether to grant or deny access to a resource access request issued by any of the processor cores, i.e., requester processor core, based on availability of the contended resource.

SUMMARY

The methods and apparatuses of various embodiments provide apparatus and methods for identifying enhanced synchronization operation outcomes in a computing device. Various embodiments may include receiving a plurality of resource access requests for a first resource of the computing device from a plurality of computing elements of the computing device, granting the first computing element access to the first resource based on the first resource access request, and returning a response to the second computing element. The plurality of resource access requests may include a first resource access request from a first computing element of the plurality of computing elements and a second resources access request from a second computing element of the plurality of computing elements. The first resource access request may include a first requester identifier from the first computing element. The second resource access request may include a second requester identifier from the second computing element. The response may include the first requester identifier as a winner computing element identifier. The computing elements may include physical processors and cores, or logical threads as defined herein.

Some embodiments may further include comparing the second requester identifier to the winner computing element identifier, and determining whether the second computing element is a winner computing element by determining whether the second requester identifier matches the winner computing element identifier.

Some embodiments may further include identifying the winner computing element from the winner computing element identifier and determining whether a criterion is met for adjusting a second resource of the computing device in response to determining that the second computing element is not the winner computing element. Such embodiments may further include adjusting the second resource by the second computing element in response to determining that the criterion is met for adjusting the second resource.

In some embodiments, determining whether a criterion is met for adjusting a second resource of the computing device may include determining, by the second computing element, a likelihood of sharing the second resource by the first computing element and the second computing element based on one or more criteria. The criteria may include the first computing element and the second computing element having a shared operating system, shared dynamic voltage and frequency scaling, and a shared topology.

Some embodiments may further include receiving a third resource access request for the first resource, the third resource access request including a third requester identifier from a third computing element of the plurality of computing elements, and returning the response to the third computing element including the first requester identifier as the winner computing element identifier.

Some embodiments may further include determining whether the second computing element has a task to execute, and sending a signal to steal a task from the first computing element in response to determining that the second computing element does not have a task to execute, in which the signal includes the second requester identifier.

Some embodiments may further include receiving a response to the attempt to steal a task, the response including a task winner computing element identifier. Such embodiments may further include comparing the second requester identifier to the task winner computing element identifier and determining whether the second computing element is a task winner computing element by determining whether the second requester identifier matches the task winner computing element identifier. Such embodiments may further include adjusting a task stealing list of the second computing element in response to determining that the second computing element is not the task winner computing element.

In some embodiments, adjusting the task stealing list of the second computing element may include re-arranging items in the stealing list based at least in part on whether a computing element is executing a recursive task or a non-recursive task.

Various embodiments may include a computing device configured for identifying enhanced synchronization operation outcomes. The computing device may include a plurality of computing elements, including a first computing element and a second computing element, a first resource, and a resource manager communicatively connected to the plurality of computing elements and the resource, and configured with resource manager-executable instructions to perform operations of one or more of the embodiment methods summarized above.

Various embodiments may include a computing device configured for identifying enhanced synchronization operation outcomes having means for performing functions of one or more of the embodiment methods summarized above.

Various embodiments may include a non-transitory processor-readable storage medium having stored thereon processor-executable instructions configured to cause a processor of a computing device to perform operations of one or more of the embodiment methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
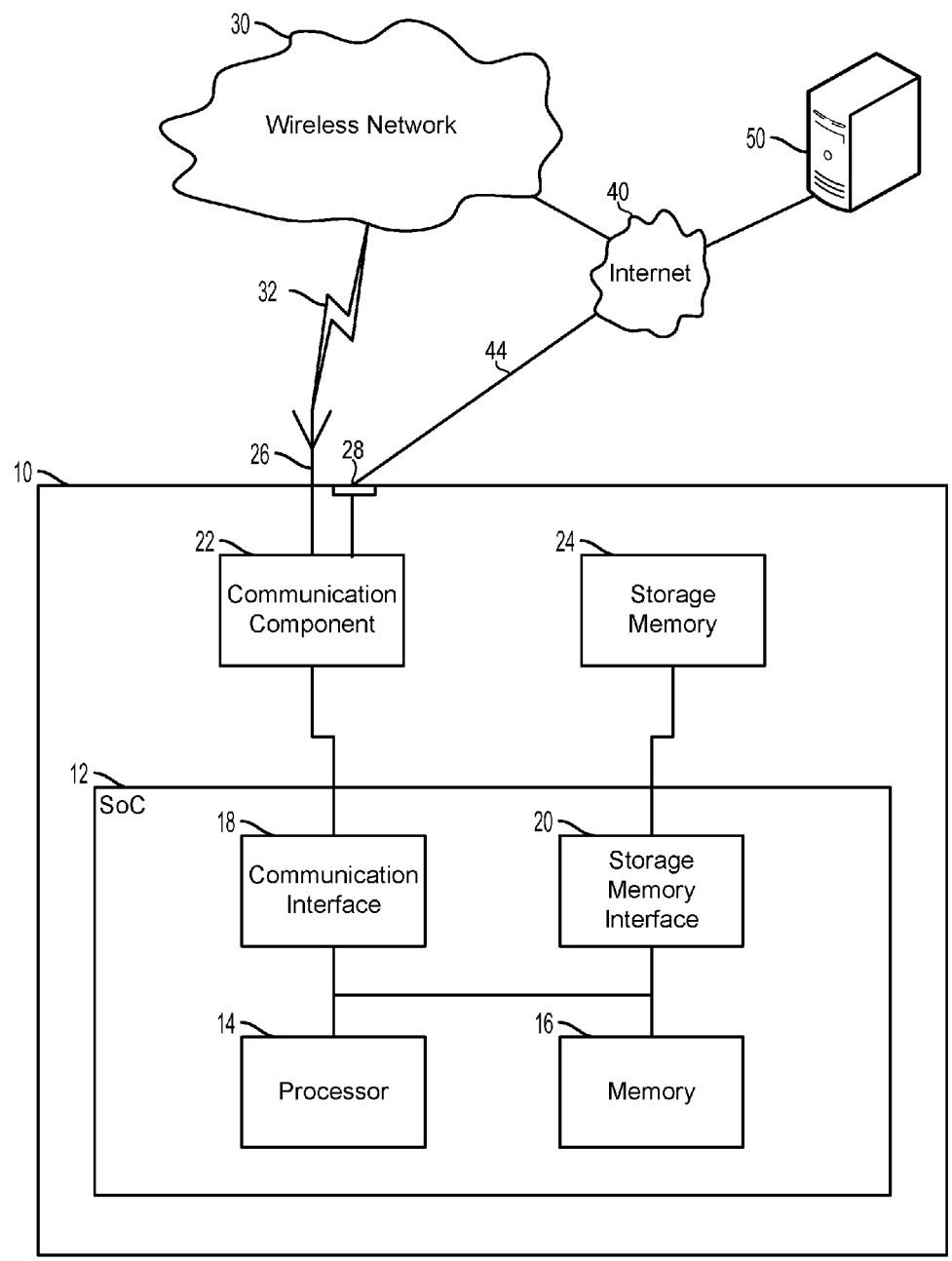
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device" and "mobile computing device" are used interchangeably herein to refer to any of a variety of electronic devices that include a memory, and a programmable processor with any number of processor cores. A processor with more than one processor core may be referred to as a multi-core processor. Examples of computing devices include cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, and wireless gaming controllers. The term "computing device" may further refer to stationary computing devices including personal computers, desktop computers, all-in-one computers, workstations, super computers, mainframe computers, embedded computers, servers, home theater computers, and game consoles. The various embodiments may be particularly useful for mobile computing devices with limited memory and battery resources. However, the embodiments may be generally useful in any electronic device that implements a plurality of memory devices and a limited power budget in which reducing the power consumption of the processors can extend the battery-operating time of the electronic device.

Embodiments may include methods, systems, and devices for sharing more information during atomic synchronization operations. The methods/apparatus may include identifying enhanced synchronization operation outcomes to a losing contender, such as by storing the information in a generally accessible register. Embodiments may include sending an identifier of each issuer of resource access requests (requester identifier) with a synchronization instruction of the request, and returning to other contenders (or storing in a register) the identifier of the issuer that is granted access (winner requester identifier) to the contended resource. Embodiments may also include methods for using the winner requester identifier (or winner identifier) to adjust resource configurations at a hardware level, and/or to adjust workload balancing heuristics (e.g., work stealing heuristics) at a software level.

Computing elements within a computing device, such as physical processors and cores, or logical threads, may issue resource access requests that include a synchronization instruction and a requester identifier of a computing element issuing an access request for a contended resource (a requester computing element). A resource manager, such as an arbiter, barrier, or controller, receiving an access request for a contended resource returns a winner identifier to the requester computing elements. The winner identifier identifies the computing element that won the contention and thus has sole ownership of the contended resource. The computing element having ownership of the contended resource may be referred to herein as the owner computing element, winner computing element, owner device, winner device, owner, or winner. The requester computing element that lost the contention to the contended resource may be referred to herein as a non-owner computing element, loser computing element, non-owner device, loser device, non-owner, or loser. The requester identifier may include an identifier for any hardware component or software element requesting access to the contended resource.

The requester computing element receiving the winner identifier of the winner computing element may determine that access to the contended resource is denied and may adjust hardware resource configurations and/or software resources based on a relationship to the winner computing element, and shared and/or topologically close resources. Adjusting resources may benefit overall performance as the loser computing element may be holding software resources that are needed for the winner computing element to make progress. Thus, a loser computing element is informed of the identity of the winner computing element, and with this information, actions may be taken to transfer ownership of the resources held by the loser computing element. For example, the loser computing element may determine a likelihood of sharing hardware resources based on whether the winner device is managed by the same operating system, managed within the same dynamic voltage and frequency scaling domain, and/or within physical proximity of the loser computing element. Based on this information, resource configurations may be adjusted, including processing frequency, voltage scaling, number of memory operations, activity states, bandwidth use, etc.

How and which resource configurations are adjusted may depend on a level of resource sharing between the winner computing element and the loser computing element, and management polices of a computing device. An implementation may include reducing the frequency of the loser computing element and increasing the winner computing element's frequency to allow the winner computing element to execute faster. Control of the respective processing frequencies of the loser computing element and the winner computing element may be implemented by an operating system (OS) as preprogrammed or at runtime in response to notification by signals of the atomic operation outcome.

The requester computing element receiving the identifier of the winner computing element may also adjust workload balancing heuristics, such as work stealing heuristics, based on the winner of the contended resource. For example, a work stealing list may include logical elements used to execute an application.

Adjusting the work balancing heuristics may involve adjusting work stealing heuristics to take into account the behavior of a task. An example of a work stealing heuristic may be one in which a logical element can steal unfinished work items from others upon completion of its original assignment. For a recursive task, which is a task launched by another task, in response to identifying an winner logical element of the contended resource, the winner logical element may be identified as potentially spawning further tasks to execute the iterations of the recursive task. The stealing list can be reordered to indicate that the winner logical element is a first one of the logical elements to check for tasks to steal. For a non-recursive task, in response to identifying a winner logical element of the contended resource, the winner logical element may be identified as having finished all of its assigned tasks for executing the application and stealing tasks from other logical elements, signifying that the winner logical element does not have any tasks for stealing. The stealing list can be modified to remove the winner logical element from the stealing list or reordered to indicate that the winner logical element is the last one of the logical elements to check for tasks to be stolen.

The identifier of the requester computing element may be stored in a register and provided to the resource manager with the synchronization instruction. State information relating to the hardware component or software element associated with the identifier may also be stored in the register and provided to the resource manager. The resource manager may return the information it received for the winner of the contended resource. The resource manager may also track contention information, including a number of failed resource access requests since a successful resource access request for the contended resource and a number of non-owners of the contended resource. The resource manager may also return the contention information.

FIG. 1 illustrates a system including a computing device 10 in communication with a remote computing device 50 suitable for use with the various embodiments. The computing device 10 may include a system-on-chip (SoC) 12 with a processor 14, a memory 16, a communication interface 18, and a storage memory interface 20. The computing device 10 may further include a communication component 22 such as a wired or wireless modem, a storage memory 24, an antenna 26 for establishing a wireless connection 32 to a wireless network 30, and/or the network interface 28 for connecting to a wired connection 44 to the Internet 40. The processor 14 may include any of a variety of hardware cores, for example a number of processor cores.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon. In various embodiments, various combinations of the components of the computing device 10 may be separate components not included on the SoC 12.

The SoC 12 may include one or more processors 14. The computing device 10 may include more than one SoCs 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. In an embodiment, one or more memories 16 may include volatile memories such as random access memory (RAM) or main memory, or cache memory. These memories 16 may be configured to temporarily hold a limited amount of data received from a data sensor or subsystem and data and/or processor-executable code instructions that are requested from non-volatile memory. These memories 16 may also be configured to temporarily hold data and/or processor executable code instructions loaded to the memories 16 from non-volatile memory in anticipation of future access based on a variety of factors. The memories 16 may also be configured to temporarily hold intermediary processing data and/or processor-executable code instructions produced by the processor 14 and temporarily stored for future quick access.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information even after the power of the computing device 10 has been removed. When the power is re-established and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
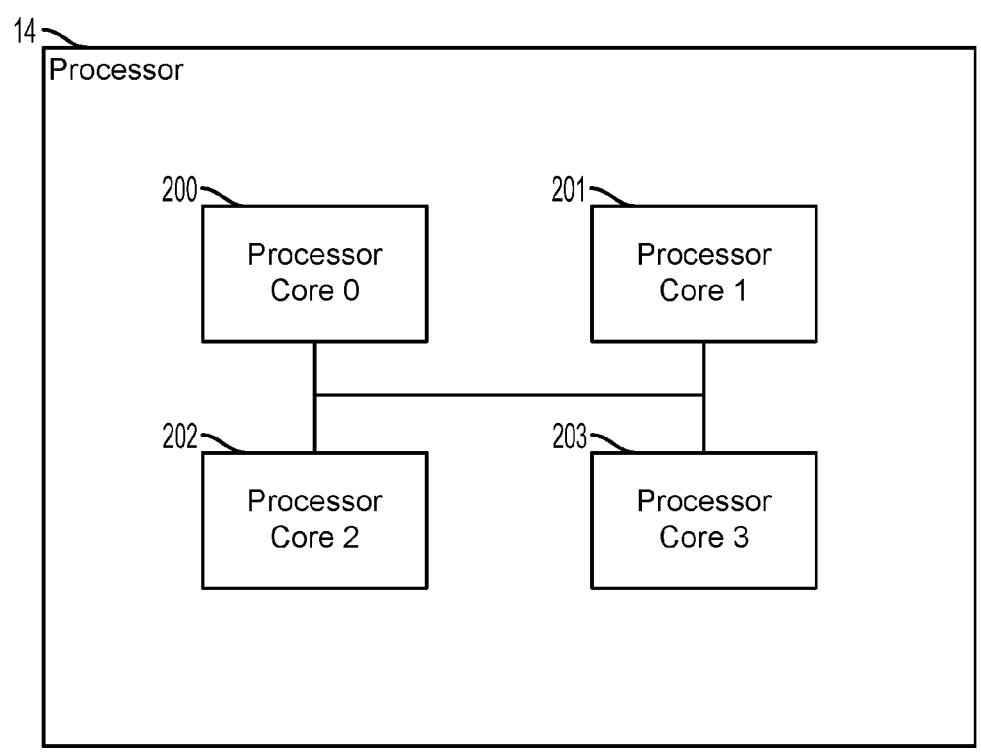
FIG. 2 is a component block diagram illustrating an example multi-core processor suitable for implementing an embodiment.

FIG. 2 illustrates a multi-core processor 14 suitable for implementing an embodiment. The multi-core processor 14 may have a plurality of homogeneous or heterogeneous processor cores 200, 201, 202, 203. The processor cores 200, 201, 202, 203 may be homogeneous in implementations in which the cores of a single processor 14 are configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big-.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the multi-core processor 14 may individually or in combination include fewer or more than the four processor cores 200, 201, 202, 203 illustrated and described herein.

Figure 3:
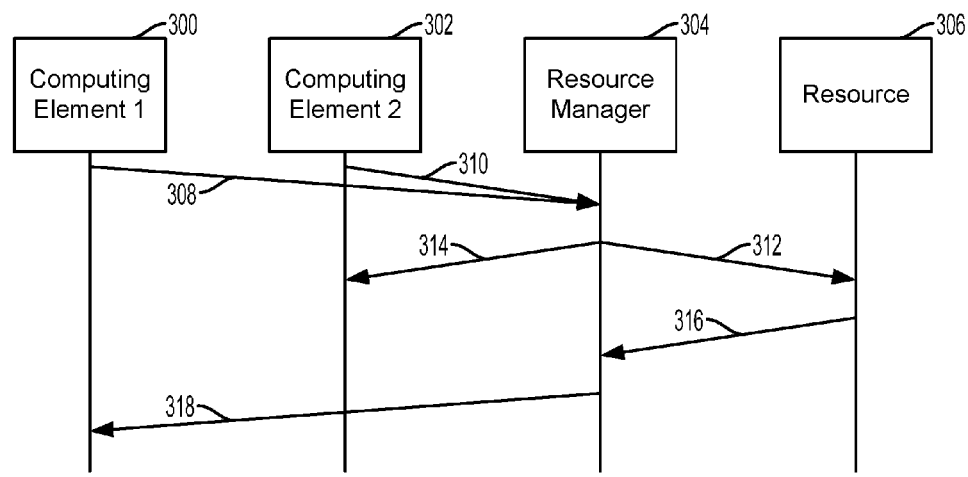
FIG. 3 is a process and signaling diagram illustrating hardware support for identifying enhanced synchronization operation outcomes according to an embodiment.

FIG. 3 illustrates a process and signaling for identifying enhanced synchronization operation outcomes according to an embodiment. The example illustrated in FIG. 3 is non-limiting, particularly with respect to the number and types of components implementing the process and signaling, and the number and order of the signals illustrated. This example includes computing elements (computing element 1 300 and computing element 2 302), a resource manager 304, and a resource 306. In various implementations, the computing elements 300, 302 may include any of the same or combination of, hardware implementations, such as processor 14, processor cores 200, 201, 202, 203, and other hardware cores, for example as described herein, and logical implementations, such as threads and processes. The resource manager 304 may also include hardware implementations, such as an arbiter, a barrier, a controller, a management unit, and an interface device. The resources 306 may include any hardware component or software elements accessible and usable by the computing elements 300, 302 to execute a task, such as a memory or storage location, an input/output port of various components, or a communication channel.

In the example illustrated in FIG. 3, both the computing element 1 300 and the computing element 2 302 may issue resource access requests to the same resource 306 or multiple resources. As a non-limiting example and for ease of explanation, the descriptions herein may refer to the computing element 1 300 and the computing element 2 302 each issuing a single resource access request 308, 310 for a single resource 306. The computing element 1 300 may issue a resource access request 308, and the computing element 2 302 may issue a resource access request 310. The resource access request 310 may include a targeted resource 306, designated for example by a virtual or physical address, an operation, and a requester identifier. A synchronization operation may be an operation that requires the requester computing element 300, 302 to have exclusive access to the resource 306 or at least exclusive access to modify the resource 306. Without exclusive access to or exclusive access to modify the resource 306, the operation may encounter errors when an unexpected value is retrieved from the resource 306 after modification of the resource 306 by the other of the computing elements 300, 302. The requester identifier may include a value uniquely identifying the computing element 300, 302 issuing the request to access the resource 306. The requester identifier may be stored in a component, such as a register, cache, or buffer associated with the computing element 300, 302, and may be retrieved from the component for inclusion in the resource access request 308, 310, respectively.

The resource manager 304 may receive the resource access requests 308, 310 and determine whether to allow access to the resource 306 by either or both of the computing elements 300, 302. In some implementations, the resource 306 may become contested and the resource manager 304 may deny access to the resource 306 by one of the computing elements 300, 302. The resource 306 may become a contested resource because multiple computing elements 300, 302 are concurrently accessing or attempting to access the resource 306.

The contention for the resource 306 may stem from the resource manager 304 denying access to one of the computing element 1 300 and the computing element 2 302 while the other accesses the resource 306. Not all concurrent attempts to access the resource 306 may be contentious. However, contention may occur when multiple computing elements 300, 302 attempt to access the resource 306 to modify the resource 306. Contention may also occur when one of the computing element's access of the resource 306 relies on a consistent state of the resource 306 while the other computing element 300, 302 modifies the state of the resource 306. Contention may also occur when access to the resource 306 by one of the computing elements 300, 302 is dependent on pervious access to the resource 306 by the other of the computing elements 300, 302.

Regardless of the reason for contention of the resource 306, the resource manager 304 may allow access to the resource 306 by one of the computing elements 300, 302 and deny access to the resource 306 by the other computing elements 300, 302. Thus, the resource 306 may allow implementation of one of the resource access requests 308, 310 and prohibit the implementation of the other of the resource access requests 308, 310.

For the allowed one of the resource access requests 308, 310, the resource manager 304 may permit implementation of an operation 312 on the resource 306. As discussed above, the operation 312 may include an operation that may modify the resource 306 or may rely on a consistent state of the resource 306 during the operation 312.

The resource manager 304 may store the requester identifier from the permitted resource access requests 308, 310. The resource manager 304 may store the requester identifier as a winner identifier, as differentiated from a loser identifier corresponding with the requester identifier of the prohibited resource access requests 308, 310. In some implementations, the winner identifier may be stored in a location accessible to the computing elements 300, 302, such as a register, so that the computing elements may check the winner identifier for use in adjusting resources as discussed further herein.

The winner identifier may be correlated with the resource 306 to allow for tracking the ownership of the resource 306, so that the resource manager 304 and other computing elements requesting access to the resource 306 may be informed that the resource 306 is owned and by which computing element. For example, the resource manager 304 may use the stored winner identifier and its correlation to the resource 306 to make further determination of whether to allow or prohibit access to other concurrent resource access requests.

In the example illustrated in FIG. 3, the resource manager 304 permits the resource access requests 308 issued by the computing element 1 300. As a result, the computing element 1 300 is the winner of the contention for the resource 306, and the requested identifier of the computing element 1 300 and the resource access requests 308 may be designated as the winner identifier.

For the prohibited one of the resource access requests 308, 310, the resource manager 304 may return a response 314 to the computing element 300, 302 having issued the prohibited one of the resource access requests 308, 310. The response 314 may indicate to the receiving computing element 300, 302 that its respective resource access request 308, 310 is denied. The response 314 may indicate denial of the resource access request 308, 310 by including a signal, such as a designated bit, that may indicate the denial by having a designated value. The response 314 may also or alternatively include the winner identifier.

The winner identifier may be used as the signal indicating the denial of the prohibited resource access request 308, 310. In this regard, the receiving computing element 300, 302 may compare the winner identifier to its own requester identifier and determine that the resource access request 308, 310 is denied in response to the winner identifier differing from its own requested identifier.

The resource manager 304 may include the signal indicating the denial of the prohibited resource access request 308, 310 and/or the winner identifier in the response 314. In the example illustrated in FIG. 3, the resource manager 304 prohibits the resource access requests 310 issued by the computing element 2 302. As a result, the computing element 2 302 is the loser of the contention for the resource 306. The resource manager 304 sends the response 314 including the winner identifier (i.e., the requester identifier of the computing element 1 300) to the computing element 2 302. The computing element 2 302 may determine that it is the loser of the contention for the resource 306 and may wait for the resource 306 to become available, continue executing tasks that can be executed without access to the resource 306, and/or adjust physical and/or logical resources as described further herein.

In response to the permitted resource access requests 308, 310, a response 316 may be generated either to notify the requester computing element 300, 302 of the permitted resource access requests 308, 310 of completion of the requested access to the resource 306 or to provide data from the resource 306. The resource manager 304 may receive the response 316, note whether the requested access to the resource 306 is complete, and may direct the response 316 to the requester computing element 300, 302 of the permitted resource access requests 308, 310 as a response 318. In some implementations, the resource manager 304 may relinquish the resource 306 upon completion of the requested access to the resource 306. In doing so, the resource manager 304 may remove or invalidate the stored winner identifier and its correlation to the resource 306.

In some implementations, the resource access requests 308, 310 may further include state information for the respective requester computing elements 300, 302. The state information may include processing frequency, voltage scaling, number of memory operations, activity states, bandwidth use, temperature, current leakage, etc.

The resource manager 304 may store and correlate the state information of the requester computing elements 300, 302 from the permitted resource access requests 308, 310 with the winner identifier. The resource manager 304 may include the state information of the requester computing elements 300, 302 from the permitted resource access requests 308, 310 as part of the response 314. The loser computing elements 300, 302 may use the state information of the winning computing elements 300, 302 in adjusting physical and/or logical resources as described further herein.

The resource manager 304 may also track contention information for the contended resource 306, including a number of failed resource access requests since a successful resource access request for the contended resource 306 and a number loser computing elements 300, 302 of the contended resource 306. The resource manager 304 may store and correlate the contention information for the contended resource 306 with the winner identifier. The resource manager 304 may include the contention information for the contended resource 306 as part of the response 314. The loser computing elements 300, 302 may use the contention information for the contended resource 306 in adjusting physical and/or logical resources as described further herein.

Figure 4:
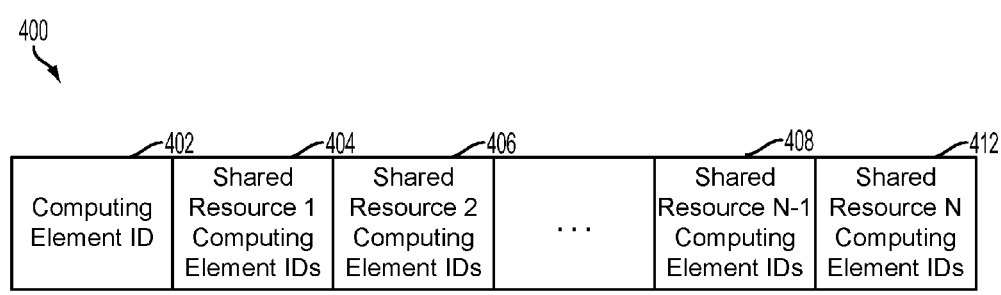
FIG. 4 is a representational diagram illustrating an identifier register according to an embodiment.

FIG. 4 illustrates an identifier register 400 according to an embodiment. Each computing element 300, 302 may include as a component or be associated with an identifier register 400. The identifier register 400 may include a location for storing the computing element identifier (ID) 402, which may be accessed for retrieving the computing element identifier for use as the requesting identifier in a resource access request.

The identifier register 400 may also include locations associated with shared resources 404-412. The shared resources may be any resource shared by the computing element 300, 302 associated with the identifier register 400 and other computing elements 300, 302 for executing tasks, as opposed to being exclusively accessed by computing element 300, 302 associated with the identifier register 400.

The locations associated with shared resources 404-412 may each be dedicated to a shared resource and store computing element identifiers for the computing elements 300, 302 that share the shared resource. For example, the identifier register 400 may include a location 404 for storing computing element identifiers that share shared resource 1, a location 406 for storing computing element identifiers that share shared resource 2, a location 408 for storing computing element identifiers that share shared resource N-1, and a location 412 for storing computing element identifiers that share shared resource N. The identifier register 400 may include any number of locations 404-412 for storing computing element identifiers for at least up to "N" number of shared resources.

The identifier register 400 associated with a loser computing element 300, 302 and a winner computing element 300, 302 may be accessed by the loser computing element 300, 302 to identify resources 306 are shared between the winner and loser computing elements 300, 302. The resources 306 shared between the winner and loser computing elements 300, 302 may be adjusted to improve the execution of a critical portion of a process by the winner computing element 300, as described further herein.

Figure 5:
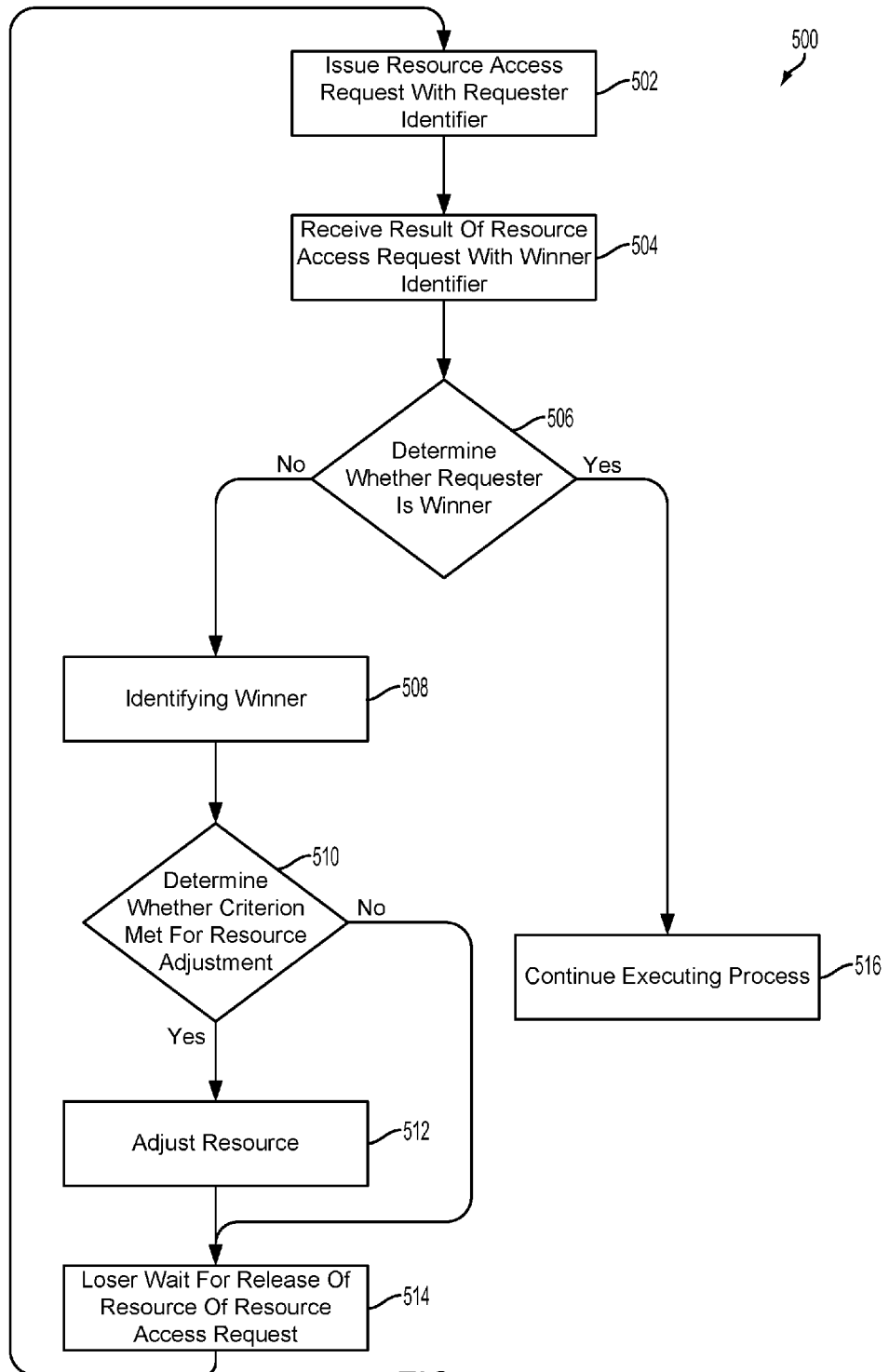
FIG. 5 is a process flow diagram illustrating an embodiment method for adjusting resources at a physical level based on a winner.

FIG. 5 illustrates a method 500 for adjusting resources at a physical level based on a winner according to various embodiments. The method 500 may be executed in a computing device using software executing on general purpose hardware, such as the processor, and/or dedicated hardware implementing the computing elements and/or the resource manager.

In block 502, the computing device may issue a resource access request including a requester identifier. As discussed herein, the requester identifier may be the computing element identifier of the computing element issuing the resource access request. Further, the resource access request may include a synchronization operation, and/or a physical or virtual address of the target resource of the resource access request. In some implementations, the resource access request may also include state information of the requester computing element, such as a processing frequency, a voltage scaling, a number of memory operations, activity states, a bandwidth use, a temperature, a current leakage, etc.

In block 504, the computing device may receive a result of the resource access request in a response including a winner identifier indicating the computing element granted access to the target resource by the resource manager in a resource contention. In some implementations, the response may include some or all of the state information of the winner computing element provided in the winner resource access request.

In determination block 506, the computing device may determine whether the requester computing element is the winner computing element. The computing device may retrieve the computing element identifier for the requester computing element from its associated identifier register, and compare the computing element identifier to the winner identifier. A comparison resulting in a match between the computing element identifier and the winner identifier may indicate that the requester computing element is the winner computing element. A comparison resulting in a mismatch between the computing element identifier and the winner identifier may indicate that the requester computing element is the loser computing element.

In response to determining that the requester computing element is the winner computing element (i.e., determination block 506="Yes"), the computing device may continue to execute a process being executed by the winner computing element in block 516. The winner computing element may be provided access to resources, such as the contested resource, necessary for executing a process. The winner computing element may leverage the access to the contested resource in order complete a portion of an operation requiring use of the resource.

The winner computing element may continue to maintain ownership of the contested resource until the contested resource is no longer needed by the winner computing element to execute the operation, upon which the winner computing element may relinquish ownership of the contested resource. In some implementations, the winner computing element may be forced to relinquish ownership of the contested resource based on various factors, including time, number of loser computing elements for the contested resource, number of denied access requests for the contested resource, use of the contested resource, etc., to avoid degradation of the performance of the computing device. In relinquishing ownership of the contested resource, the winner computing element may send a notification signal to the resource manager, the loser computing element, other computing elements, and/or a register accessible by multiple computing elements that the contested resource is available. In some implementations, the resource manager may send the notification signal to the loser computing element, other computing elements, and/or a register accessible by multiple computing elements that the contested resource is available.

In response to determining that the requester computing element is not the winner computing element or is the loser computing element (i.e., determination block 506="No"), the computing device may identify the winner computing element. The computing device may identify the winner computing element as the computing element associated with the winner identifier included with the response to the resource access request received in block 504. The computing device may use the winner identifier to determine a relationship between the winner computing element and the loser computing element for adjusting physical and/or logical resources as described herein.

The computing device may determine whether a criterion is met for adjusting physical and/or logical resources of the computing device in determination block 510. In computing devices with multiple operating systems, dynamic voltage and frequency scaling domains, and topologies, the loser computing element may tune local and/or shared resources. The resources for tuning may be shared between the loser computing element and the winner computing element. In making this determination, the computing device may determine whether a criterion is met for adjusting physical and/or logical resources of the computing device when any of the conditions described herein are met and adjusting the resources is likely to improve the performance of the computing device. In various implementations, the criterion may depend, at least in part, on a relationship between the loser computing element and the winner computing element. The loser computing element may use the information of the winner computing device identified in block 508 to make the determination in determination block 510.

In response to determining that a criterion is met for adjusting physical and/or logical resources of the computing device (i.e., determination block 510="Yes"), the computing device may adjust physical and/or logical resources of the computing device in block 512. Adjusting the physical and/or logical resources of the computing device may be implemented as described herein and in any manner that may benefit the performance of the computing device. For example, the loser computing element may adjust hardware resource configurations and/or software resources based on a relationship to the winner computing element, shared resources, and/or topologically close resources.

Adjusting resources in block 512 may benefit overall performance of the computing device, as the loser computing element may be holding resources that are needed for the winner computing element to make progress in executing the process. For example, the loser computing element may determine a likelihood of sharing hardware resources based on whether the winner computing element is managed by the same operating system, managed within the same dynamic voltage and frequency scaling domain, and is in close physical proximity of the winner computing element. Based on this information, resource configurations may be adjusted, including processing frequency, voltage scaling, number of memory operations, activity states, bandwidth use, in flight misses, etc.

How and which resource configurations are adjusted in block 512 may depend on a level of resource sharing between the winner computing element and the loser computing element, and management polices of a computing device. Some implementations may include the loser computing element reducing its processing frequency and increasing the winner computing element's frequency to reduce the time needed to execute a critical section of an application including the atomic operations of the winner computing element using the contended resource. In another example, the loser computing element may adjust its cache bandwidth use and/or in-flight misses to reduce the number of outstanding miss requests for a period of time, thereby also reducing the number of slower storage lookups necessary, and allowing greater resources to be used by the winner computing element.

Following or in parallel with adjusting resources, or in response to determining that no criterion is met for adjusting physical and/or logical resources of the computing device (i.e., determination block 510="No"), the computing device may wait for the winner computing element to release ownership of the contested resource in block 514. As discussed herein, the loser computing element may be notified of the release ownership of the contested resource by the winner computing element in multiple way. In some implementations, the loser computing element may receive a signal from the winner computing element or the resource manager indicating the release ownership of the contested resource by the winner computing element. In some implementations, the loser computing element may check an accessible register for an indication of the release of ownership of the contested resource by the winner computing element. Upon being notified of the release of ownership of the contested resource by the winner computing element, the computing device may issue a resource access request including a requester identifier in block 502.

Figure 6:
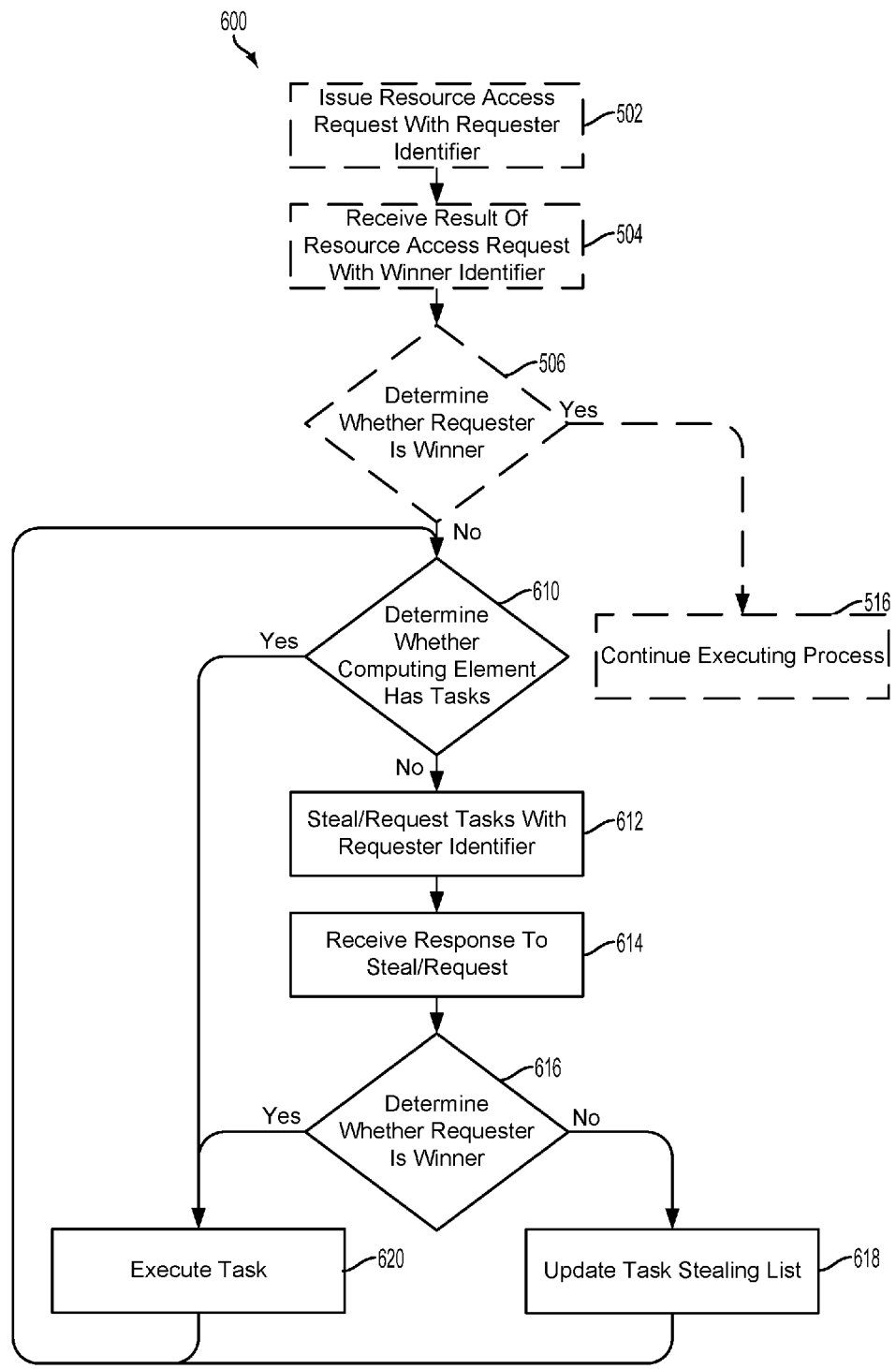
FIG. 6 is a process flow diagram illustrating an embodiment method for adjusting task stealing heuristics at a logical level based on a winner.

FIG. 6 illustrates an embodiment method 600 for adjusting tasks stealing heuristics at a logical level based on a winner according to various embodiments. The method 600 may be executed in a computing device using software executing on general purpose hardware, such as the processor, and/or dedicated hardware implementing the computing elements and/or the resource manager.

Blocks 502-506 and 516 may be implemented in a manner similar to that of like numbered blocks in method 500 as described with reference to FIG. 5. In some implementations of the method 600, blocks 502-506 and 516 may be optionally implemented.

In response to determining that the requester computing element is not the winner computing element or is the loser computing element (i.e., determination block 506="No"), the computing device may determine whether the loser computing element has a task that is executable without access to the contested resource in determination block 610.

In response to determining that the loser computing element does not have a task that is executable without access to the contested resource (i.e., determination block 610="No"), the computing device may attempt to steal or request tasks in block 612. Like the resource access request, a signal to steal or request tasks may include the computing element identifier (requester identifier) of the computing element sending the signal to steal or request work, i.e., the loser computing element. The loser computing element may send a general signal to a resource manager implementing a scheduler, or check computing elements in its stealing list for computing elements likely to have available tasks and signal specifying the computing elements. In some implementations, the stealing list may contain computing elements executing the same application as the loser computing element. Like the resource access request, the resource manager may determine a winner and a loser from multiple computing elements attempting to steal or request tasks, and return to or make available to the computing elements the winner identifier.

In block 614, the computing device may receive a response to the signal to steal or request tasks. The response may include the winner identifier, and for winner computing elements, a task assignment to execute.

In determination block 616, the computing device may determine whether the loser computing element is a winner computing element for the task stealing or request. Like determining whether the computing element is a winner computing element in block 506, the computing device may compare the winner identifier with the computing element identifier of the issuer of the signal to steal or request tasks in determination block 616. A comparison resulting in a match between the computing element identifier and the winner identifier may indicate that the requester computing element is the task winner computing element. A comparison resulting in a mismatch between the computing element identifier and the winner identifier may indicate that the requester computing element is the task loser computing element.

In response to determining that the loser computing element is the task winner computing element (i.e. determination block 616="Yes"), the computing device may execute the stolen or received tasks.

In response to determining that the loser computing element is not the task winner computing element or is the task loser computing element (i.e. determination block 616="No"), the computing device may update or adjust the task stealing list of the task loser computing element in block 618.

Adjusting the stealing list in block 618 may take into account behavior of the application. For a task winner computing element executing a non-recursive task, the task winner computing element may be identified as having finished all of its assigned tasks for executing the application and stealing tasks from other computing elements, signifying that the task winner computing element does not have any tasks for stealing. For example, in an application with non-recursive tasks, once a computing element finishes initially assigned tasks, the computing element will commence to look for other tasks by stealing or requesting other tasks. Thus, if a computing element is contending for tasks, then it has finished its initially assigned tasks and does not have any tasks to steal or give. The stealing list can be modified to remove the task winner computing element from the stealing list or reordered to indicate that the task winner computing element is the last one of the computing elements to check for tasks.

For a task winner computing element executing a recursive task, the task winner computing element may be identified as potentially spawning further tasks to execute the iterations of the recursive task. For example, in an application with recursive tasks, once a computing element finishes initially assigned tasks, the computing element will commence to look for other tasks by stealing or requesting other tasks. Thus, if a computing element is contending for tasks, then it has finished its initially assigned tasks, but may generate more task to steal or give if assigned further recursive tasks. The stealing list can be reordered to indicate that the task winner computing element be a first one of the computing elements to check for tasks.

Figure 7:
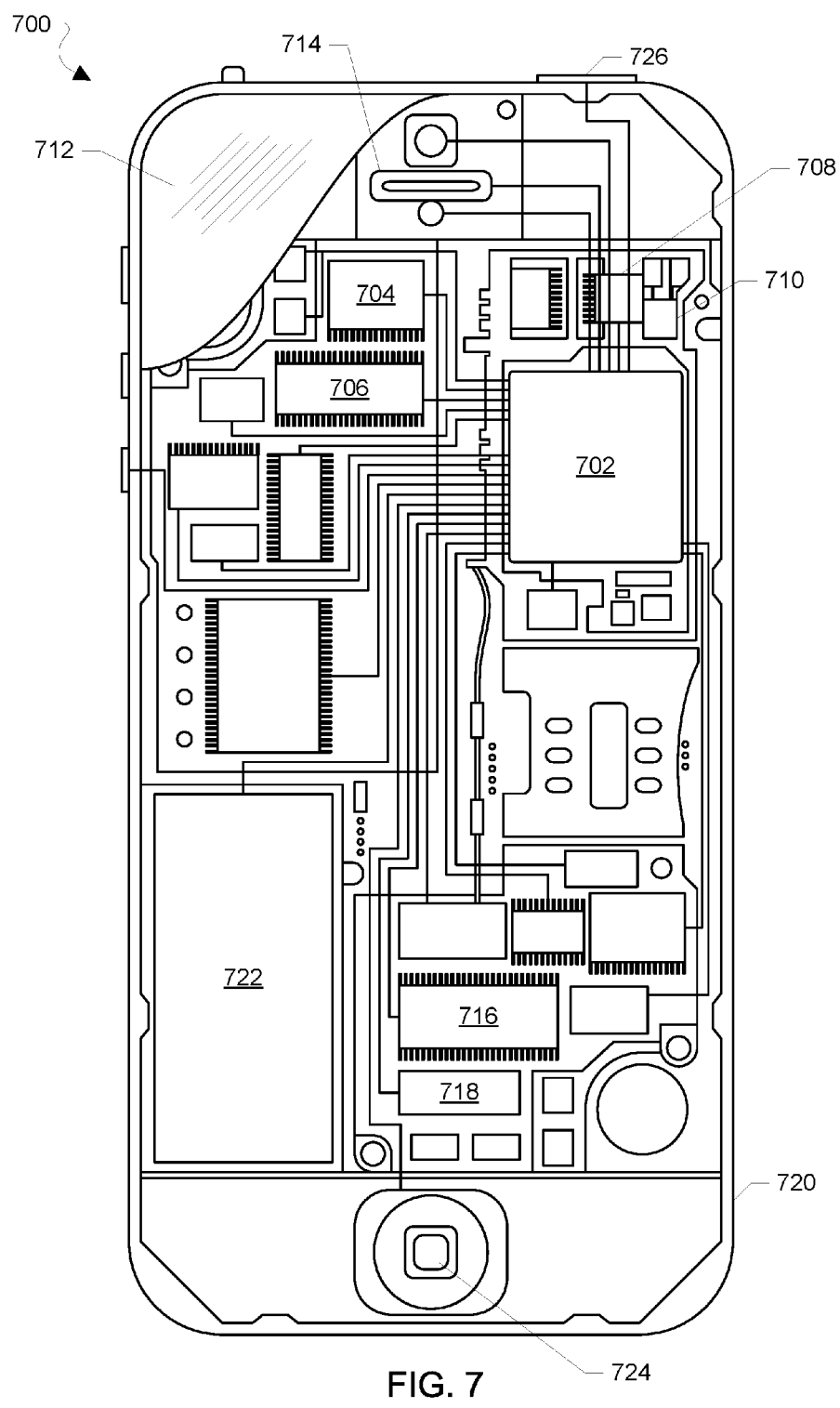
FIG. 7 is component block diagram illustrating an example mobile computing device suitable for use with the various embodiments.

The various embodiments (including, but not limited to, embodiments discussed above with reference to FIGS. 1-6) may be implemented in a wide variety of computing systems, which may include an example mobile computing device suitable for use with the various embodiments illustrated in FIG. 7. The mobile computing device 700 may include a processor 702 coupled to a touchscreen controller 704 and an internal memory 706. The processor 702 may be one or more multi-core integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded dynamic random access memory (DRAM). The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the computing device 700 need not have touch screen capability.

The mobile computing device 700 may have one or more radio signal transceivers 708 (e.g., Peanut, Bluetooth, Zig-Bee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as USB, FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components discussed herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
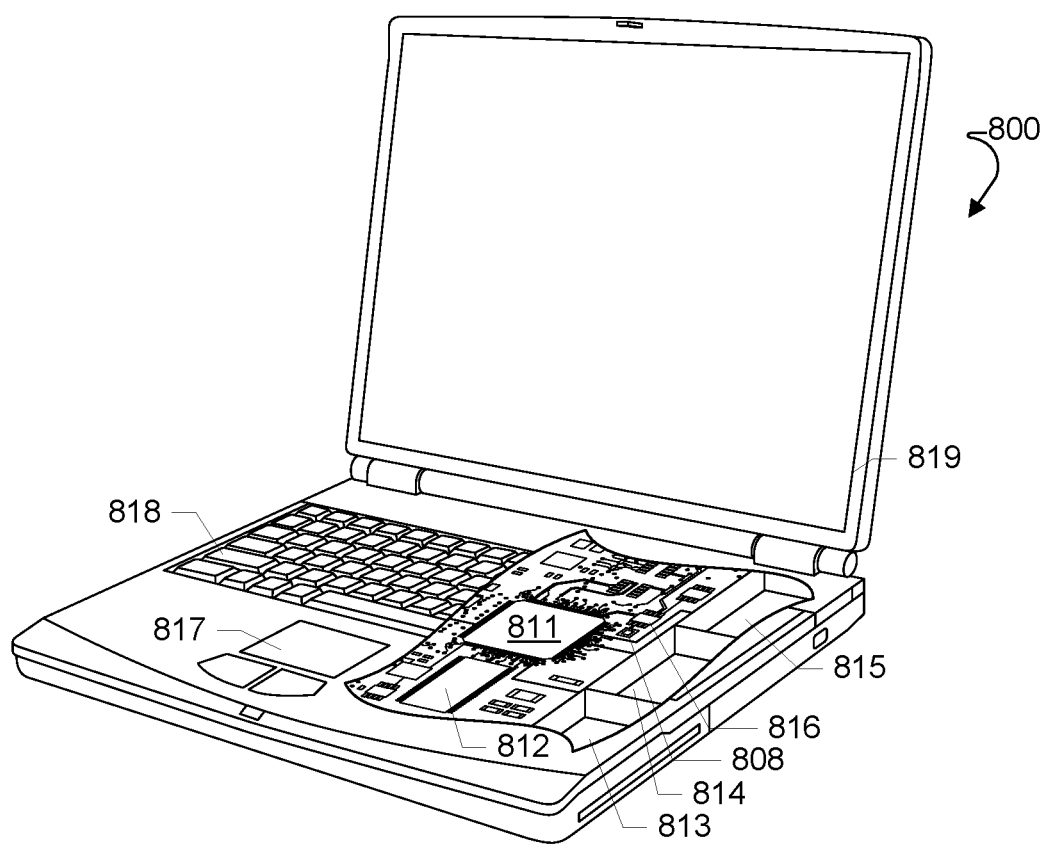
FIG. 8 is component block diagram illustrating an example mobile computing device suitable for use with the various embodiments.

The various embodiments (including, but not limited to, embodiments discussed above with reference to FIGS. 1-6) may be implemented in a wide variety of computing systems, which may include a variety of mobile computing devices, such as a laptop computer 800 illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 811 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 811. The computer 800 may also include a floppy disc drive 814 and a compact disc (CD) drive 815 coupled to the processor 811. In a notebook configuration, the computer housing includes the touchpad 817, the keyboard 818, and the display 819 all coupled to the processor 811. Other configurations of the computing device may include a computer mouse or trackball coupled to the processor (e.g., via a universal serial bus (USB) input) as are well known, which may also be used in conjunction with the various embodiments.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of identifying enhanced synchronization operation outcomes in a computing device, comprising:
    receiving a plurality of resource access requests for a first resource of the computing device from a plurality of computing elements of the computing device including a first resource access request having a first requester identifier from a first computing element of the plurality of computing elements and a second resource access request having a second requester identifier from a second computing element of the plurality of computing elements;
    granting the first computing element access to the first resource based on the first resource access request;
    returning a response to the second computing element including the first requester identifier as a winner computing element identifier;
    determining whether the second computing element has a task to execute;
    sending a signal to steal a task from the first computing element in response to determining that the second computing element does not have a task to execute, wherein the signal includes the second requester identifier;
    receiving a response to the signal to steal a task including a task winner computing element identifier;
    comparing the second requester identifier to the task winner computing element identifier;
    determining whether the second computing element is a task winner computing element by the second requester identifier matching the task winner computing element identifier; and
    adjusting a task stealing list of the second computing element in response to determining that the second computing element is not the task winner computing element.

2. The method of claim 1, further comprising:
    comparing the second requester identifier to the winner computing element identifier; and
    determining whether the second computing element is a winner computing element by the second requester identifier matching the winner computing element identifier.

3. The method of claim 2, further comprising:
    identifying the winner computing element from the winner computing element identifier;
    determining whether a criterion is met for adjusting a second resource of the computing device in response to determining that the second computing element is not the winner computing element; and adjusting the second resource by the second computing element in response to determining that the criterion is met for adjusting the second resource.

4. The method of claim 3, wherein determining whether a criterion is met for adjusting a second resource of the computing device comprises determining, by the second computing element, a likelihood of sharing the second resource by the first computing element and the second computing element based on one or more of a shared operating system, shared dynamic voltage and frequency scaling, and a shared topology.

5. The method of claim 1, further comprising:
receiving a third resource access request for the first resource including a third requester identifier from a third computing element of the plurality of computing elements; and
returning the response to the third computing element including the first requester identifier as the winner computing element identifier.

6. The method of claim 1, wherein adjusting the task stealing list of the second computing element comprises re-arranging items in the task stealing list based at least in part on whether a computing element is executing a recursive task or a non-recursive task.

7. A computing device configured for identifying enhanced synchronization operation outcomes, comprising:
a plurality of computing elements, including a first computing element and a second computing element;
a first resource; and
a resource manager communicatively connected to the plurality of computing elements and the first resource, wherein the resource manager is configured with executable instructions to perform operations comprising:
receiving a plurality of resource access requests for the first resource including a first resource access request having a first requester identifier from the first computing element and a second resource access request having a second requester identifier from the second computing element;
granting the first computing element access to the first resource based on the first resource access request; and
returning a response to the second computing element including the first requester identifier as a winner computing element identifier; and
wherein the second computing element is configured with executable instructions to perform operations comprising:
determining whether the second computing element has a task to execute;
sending a signal to steal a task from the first computing element in response to determining that the second computing element does not have a task to execute, wherein the signal includes the second requester identifier;
receiving a response to the signal to steal a task including a task winner computing element identifier;
comparing the second requester identifier to the task winner computing element identifier;
determining whether the second computing element is a task winner computing element by the second requester identifier matching the task winner computing element identifier; and adjusting a task stealing list of the second computing element in response to determining that the second computing element is not the task winner computing element.

8. The computing device of claim 7, wherein the second computing element is configured with executable instructions to perform operations comprising:
comparing the second requester identifier to the winner computing element identifier; and
determining whether the second computing element is a winner computing element by the second requester identifier matching the winner computing element identifier.

9. The computing device of claim 8, further comprising a second resource communicatively connected to the second computing element, wherein the second computing element is configured with executable instructions to perform operations further comprising:
identifying the winner computing element from the winner computing element identifier;
determining whether a criterion is met for adjusting the second resource in response to determining that the second computing element is not the winner computing element; and
adjusting the second resource in response to determining that the criterion is met for adjusting the second resource.

10. The computing device of claim 9, wherein the second computing element is configured with executable instructions to perform operations such that determining whether a criterion is met for adjusting the second resource comprises determining a likelihood of sharing the second resource by the first computing element and the second computing element based on one or more of a shared operating system, shared dynamic voltage and frequency scaling, and a shared topology.

11. The computing device of claim 7, wherein the plurality of computing elements further comprises a third computing element, and wherein the resource manager is configured with executable instructions to perform operations further comprising:
receiving a third resource access request for the first resource including a third requester identifier from the third computing element; and
returning the response to the third computing element including the first requester identifier as the winner computing element identifier.

12. The computing device of claim 7, wherein the second computing element is configured with computing element-executable instructions to perform operations such that adjusting the task stealing list of the second computing element comprises re-arranging items in the task stealing list based at least in part on whether a computing element is executing a recursive task or a non-recursive task.

13. A computing device configured for identifying enhanced synchronization operation outcomes, comprising:
means for receiving a plurality of resource access requests for a first resource of the computing device from a plurality of computing elements of the computing device including a first resource access request having a first requester identifier from a first computing element of the plurality of computing elements and a second resource access request having a second requester identifier from a second computing element of the plurality of computing elements;

means for granting the first computing element access to the first resource based on the first resource access request;
means for returning a response to the second computing element including the first requester identifier as a winner computing element identifier;
means for determining whether the second computing element has a task to execute;
means for sending a signal to steal a task from the first computing element in response to determining that the second computing element does not have a task to execute, wherein the signal includes the second requester identifier;
means for receiving a response to the signal to steal a task including a task winner computing element identifier;
means for comparing the second requester identifier to the task winner computing element identifier;
means for determining whether the second computing element is a task winner computing element by the second requester identifier matching the task winner computing element identifier; and
means for adjusting a task stealing list of the second computing element in response to determining that the second computing element is not the task winner computing element.

14. The computing device of claim 13, further comprising:
means for comparing the second requester identifier to the winner computing element identifier; and
means for determining whether the second computing element is a winner computing element by the second requester identifier matching the winner computing element identifier.

15. The computing device of claim 14, further comprising:
means for identifying the winner computing element from the winner computing element identifier;
means for determining whether a criterion is met for adjusting a second resource of the computing device in response to determining that the second computing element is not the winner computing element; and
means for adjusting the second resource in response to determining that the criterion is met for adjusting the second resource.

16. The computing device of claim 15, wherein means for determining whether a criterion is met for adjusting a second resource of the computing device comprises means for determining a likelihood of sharing the second resource by the first computing element and the second computing element based on one or more of a shared operating system, shared dynamic voltage and frequency scaling, and a shared topology.

17. The computing device of claim 13, further comprising:
means for receiving a third resource access request for the first resource including a third requester identifier from a third computing element of the plurality of computing elements; and
means for returning the response to the third computing element including the first requester identifier as the winner computing element identifier.

18. The computing device of claim 13, wherein means for adjusting the task stealing list of the second computing element comprises means for re-arranging items in the task stealing list based at least in part on whether a computing element is executing a recursive task or a non-recursive task.

19. A non-transitory processor-readable storage medium having stored thereon processor-executable instructions configured to cause a processor of a computing device to perform operations comprising:
receiving a plurality of resource access requests for a first resource of the computing device from a plurality of computing elements of the computing device including a first resource access request having a first requester identifier from a first computing element of the plurality of computing elements and a second resource access request having a second requester identifier from a second computing element of the plurality of computing elements;
granting the first computing element access to the first resource based on the first resource access request;
returning a response to the second computing element including the first requester identifier as a winner computing element identifier;
determining whether the second computing element has a task to execute;
sending a signal to steal a task from the first computing element in response to
determining that the second computing element does not have a task to execute, wherein the signal includes the second requester identifier;
receiving a response to the signal to steal a task including a task winner computing element identifier;
comparing the second requester identifier to the task winner computing element identifier;
determining whether the second computing element is a task winner computing element by the second requester identifier matching the task winner computing element identifier; and
adjusting a task stealing list of the second computing element in response to determining that the second computing element is not the task winner computing element.

20. The non-transitory processor-readable storage medium of claim 19, wherein the stored processor-executable instructions are configured to cause the processor to perform operations further comprising:
comparing the second requester identifier to the winner computing element identifier; and
determining whether the second computing element is a winner computing element by the second requester identifier matching the winner computing element identifier.

21. The non-transitory processor-readable storage medium of claim 20, wherein the stored processor-executable instructions are configured to cause the processor to perform operations further comprising:
identifying the winner computing element from the winner computing element identifier;
determining whether a criterion is met for adjusting a second resource of the computing device in response to determining that the second computing element is not the winner computing element and
adjusting the second resource in response to determining that the criterion is met for adjusting the second resource.

22. The non-transitory processor-readable storage medium of claim 21, wherein the stored processor-executable instructions are configured to cause the processor to perform operations such that determining whether a criterion is met for adjusting a second resource of the computing device comprises determining a likelihood of sharing the second resource by the first computing element and the second computing element based on one or more of a shared operating system, shared dynamic voltage and frequency scaling, and a shared topology.

23. The non-transitory processor-readable storage medium of claim 19, wherein the stored processor-executable instructions are configured to cause the processor to perform operations further comprising:
receiving a third resource access request for the first resource including a third requester identifier from a third computing element of the plurality of computing elements; and
returning the response to the third computing element including the first requester identifier as the winner computing element identifier.

24. The non-transitory processor-readable storage medium of claim 19, wherein the stored processor-executable instructions are configured to cause the processor to perform operations such that adjusting the task stealing list of the second computing element comprises re-arranging items in the task stealing list based at least in part on whether a computing element is executing a recursive task or a non-recursive task.

25. A method of identifying enhanced synchronization operation outcomes in a computing device, comprising:
receiving a plurality of resource access requests for a first resource of the computing device from a plurality of computing elements of the computing device including a first resource access request having a first requester identifier from a first computing element of the plurality of computing elements and a second resource access request having a second requester identifier from a second computing element of the plurality of computing elements;
granting the first computing element access to the first resource based on the first resource access request;
returning a response to the second computing element including the first requester identifier as a winner computing element identifier;
identifying a winner computing element from the winner computing element identifier;
determining whether a criterion is met for adjusting a second resource of the computing device that is separate from the first resource of the computing device in response to identifying the winner computing element is the first computing element; and
adjusting the second resource by the second computing element in response to determining that the criterion is met for adjusting the second resource.

26. The method of claim 25, wherein determining whether a criterion is met for adjusting a second resource of the computing device comprises determining, by the second computing element, a likelihood of sharing the second resource by the first computing element and the second computing element based on one or more of a shared operating system, shared dynamic voltage and frequency scaling, and a shared topology.

27. A computing device configured for identifying enhanced synchronization operation outcomes, comprising:
a plurality of computing elements, including a first computing element and a second computing element;
a first resource;
a second resource communicatively connected to the second computing element;
a resource manager communicatively connected to the plurality of computing elements and the first resource, wherein the resource manager is configured with executable instructions to perform operations comprising:
receiving a plurality of resource access requests for the first resource including a first resource access request having a first requester identifier from the first computing element and a second resource access request having a second requester identifier from the second computing element;
granting the first computing element access to the first resource based on the first resource access request; and
returning a response to the second computing element including the first requester identifier as a winner computing element identifier; and
wherein the second computing element is configured with executable instructions to perform operations comprising:
identifying a winner computing element from the winner computing element identifier;
determining whether a criterion is met for adjusting the second resource that is separate from the first resource in response to identifying the winner computing element is the first computing element; and
adjusting the second resource in response to determining that the criterion is met for adjusting the second resource.

28. The computing device of claim 27, wherein the second computing element is configured with executable instructions to perform operations such that determining whether a criterion is met for adjusting the second resource comprises determining a likelihood of sharing the second resource by the first computing element and the second computing element based on one or more of a shared operating system, shared dynamic voltage and frequency scaling, and a shared topology.

29. A computing device configured for identifying enhanced synchronization operation outcomes, comprising:
means for receiving a plurality of resource access requests for a first resource of the computing device from a plurality of computing elements of the computing device including a first resource access request having a first requester identifier from a first computing element of the plurality of computing elements and a second resource access request having a second requester identifier from a second computing element of the plurality of computing elements;
means for granting the first computing element access to the first resource based on the first resource access request;
means for returning a response to the second computing element including the first requester identifier as a winner computing element identifier;
means for identifying a winner computing element from the winner computing element identifier;
means for determining whether a criterion is met for adjusting a second resource of the computing device that is separate from the first resource of the computing device in response to identifying the winner computing element is the first computing element; and
means for adjusting the second resource in response to determining that the criterion is met for adjusting the second resource.

30. The computing device of claim 29, wherein means for determining whether a criterion is met for adjusting a second resource of the computing device comprises means for determining a likelihood of sharing the second resource by the first computing element and the second computing element based on one or more of a shared operating system, shared dynamic voltage and frequency scaling, and a shared topology.

31. A non-transitory processor-readable storage medium having stored thereon processor-executable instructions configured to cause a processor of a computing device to perform operations comprising:
receiving a plurality of resource access requests for a first resource of the computing device from a plurality of computing elements of the computing device including a first resource access request having a first requester identifier from a first computing element of the plurality of computing elements and a second resource access request having a second requester identifier from a second computing element of the plurality of computing elements;
granting the first computing element access to the first resource based on the first resource access request;
returning a response to the second computing element including the first requester identifier as a winner computing element identifier;
identifying a winner computing element from the winner computing element identifier;
determining whether a criterion is met for adjusting a second resource of the computing device that is separate from the first resource of the computing device in response to identifying the winner computing element is the first computing element; and
adjusting the second resource in response to determining that the criterion is met for adjusting the second resource.

32. The non-transitory processor-readable storage medium of claim 31, wherein the stored processor-executable instructions are configured to cause the processor to perform operations such that determining whether a criterion is met for adjusting a second resource of the computing device comprises determining, by the second computing element, a likelihood of sharing the second resource by the first computing element and the second computing element based on one or more of a shared operating system, shared dynamic voltage and frequency scaling, and a shared topology.

* * * * *